June 19, 1934.   R. C. BURNLEY   1,963,435
RAT TRAP
Filed July 10, 1933   2 Sheets-Sheet 1
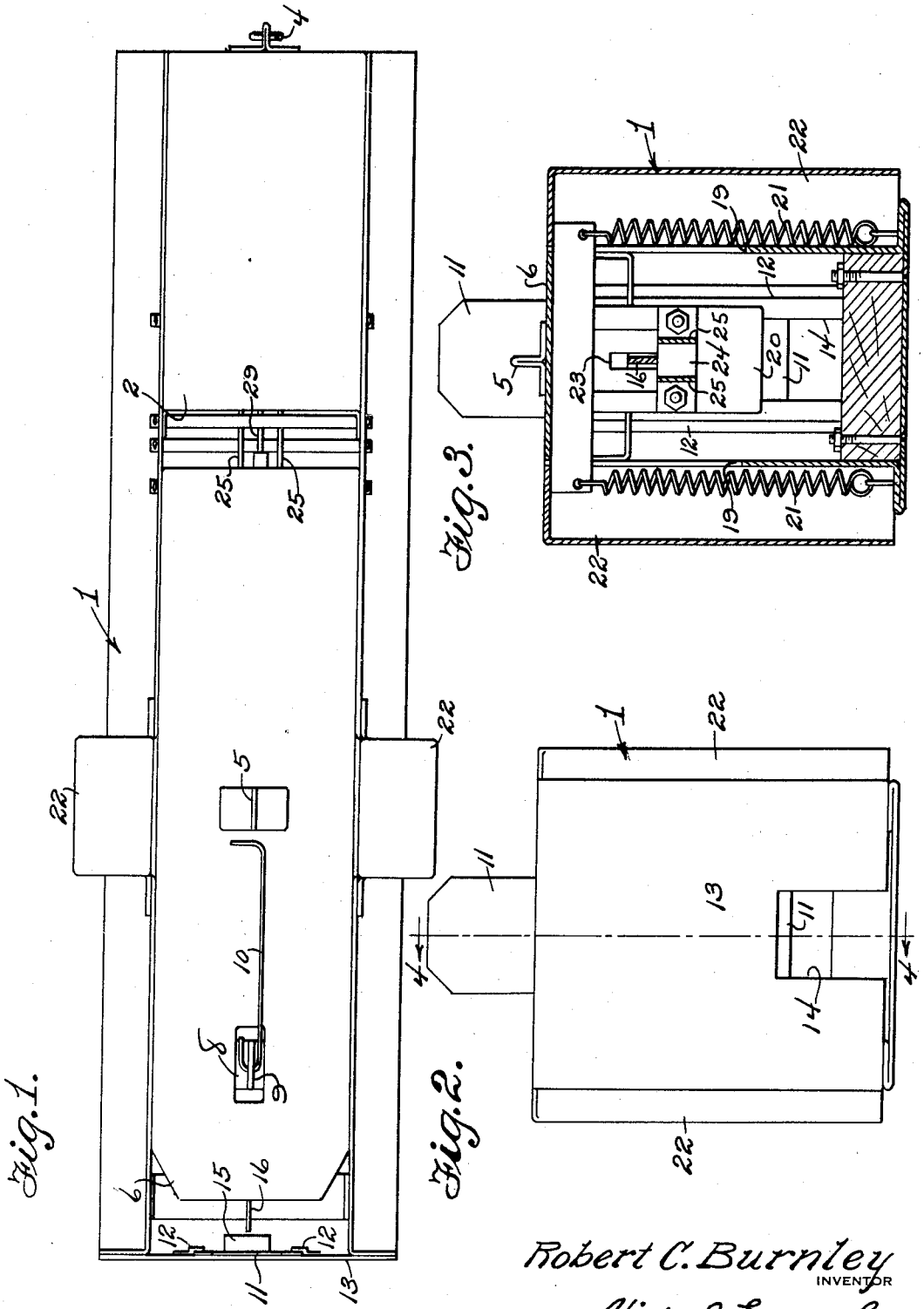
Robert C. Burnley
INVENTOR
BY Victor J. Evans & Co.
ATTORNEY

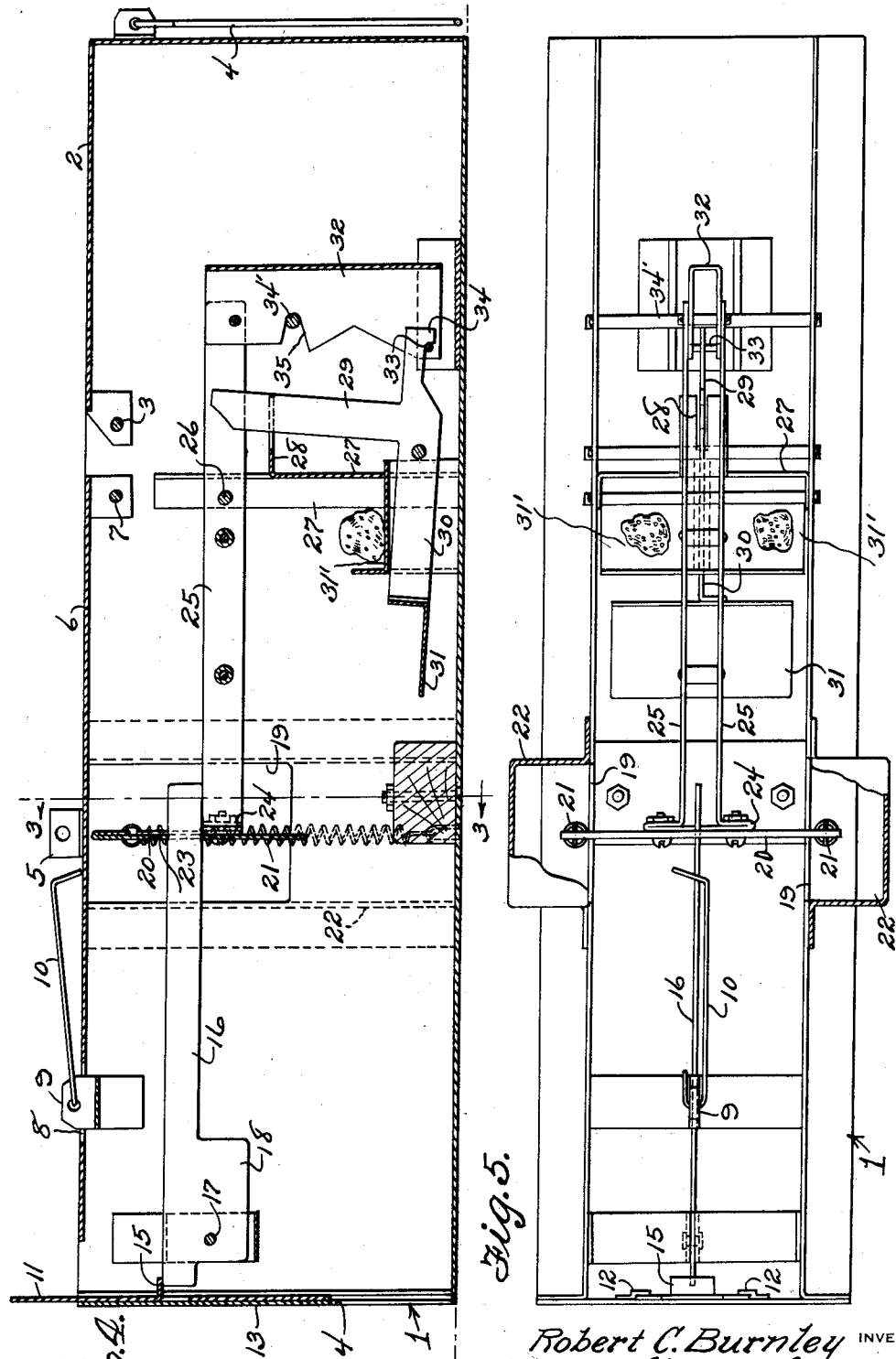

Patented June 19, 1934

1,963,435

UNITED STATES PATENT OFFICE 1,963,435

RAT TRAP

Robert C. Burnley, Louisville, Ky.

Application July 10, 1933, Serial No. 679,791

3 Claims. (Cl. 43—61)

This invention relates to traps and has for its object the provision of a simple, compact and efficient device whereby animals may be trapped and humanely killed.

The device is intended in particular for trapping small animals, such as rats and seeks to provide such a device which will operate with precision and which will close the trap to other animals after the trapping and killing of an animal.

A trap embodying the invention is illustrated in the accompanying drawings and will be hereinafter fully set forth and defined.

In the drawings:

Figure 1 is a top plan view of a trap embodying the present invention.

Figure 2 is an end view of the same.

Figure 3 is a transverse section.

Figure 4 is a central longitudinal section on the line 4—4 of Figure 2, the line 3—3 in Figure 4 indicating the plane upon which the section shown in Figure 3 is taken.

Figure 5 is a view, partly in plan and partly in section, with the top of the trap removed.

In carrying out the invention, there is provided a casing 1 which will preferably be constructed of sheet metal in order to reduce the cost and attain durability. This casing is preferably of oblong form and is provided at one end with a door 2 of rightangular form having one side adapted to constitute an end wall of the trap when the door is closed and another side which forms part of the top of the trap when the door is closed. The door is pivoted, as at 3, at the free edge of its upper side and upon its vertical side is equipped with a latch 4 which is adapted to engage a perforated lug 5 on the top of the trap when the door is to be held in open position during setting of the trap. Another door 6 extends from a point adjacent the pivot 3 to a point near the opposite end of the body of the trap, this second door or roof being pivoted, at 7, in the same manner that the door 2 is pivoted and carrying the lug 5, as shown. Near its free end the door 6 is slotted or formed with an opening 8 to accommodate a bracket 9 which is secured within the trap and carries a latch or hook 10 which is adapted to be engaged with a trap door 11 when it is desired to hold said door in raised position while setting the trap. The door 11 is a sliding plate mounted in suitable guides 12 on the fixed end wall 13 of the trap, an opening 14 being formed in said end wall to admit an animal unless it is covered by the door 11, as will be understood. The door 11 is provided with a lug or offset 15 on its inner side which may be engaged by the hook or latch 10 while the trap is being set and after the trap is set will be supported by resting upon the shorter end of a trip arm or lever 16. The trip arm or lever 16 is pivoted near the end wall 13 by a pin or bolt 17 suitably mounted within the body of the trap and the lever is weighted, as shown at 18, at and near the pivot so that it will effectually sustain the door in raised position until it is released by the trap mechanism. Openings 19 are provided in the sides of the trap body between the ends thereof to accommodate the projecting ends of an animal killing medium 20, retractile springs 21 being attached at their upper ends to said projecting ends of the medium 20 and at their lower ends to the base of the trap, as clearly shown in Figure 3. To house the springs and protect them against accidental blows which might break them or damage them to such extent that they would not operate, housings 22 are secured in the sides of the trap body, as shown. The medium 20 is provided with a vertical slot 23 between its upper and lower ends which receives the end of the trip lever 16, as will be understood upon reference to Figures 3 and 4, the end of the lever resting upon the lower end of the slot and upon a cross brace 24 which is secured to the medium 20. This brace 24 may conveniently be a portion of a strap of sheet metal which is doubled upon itself at the ends of the brace and includes a pair of parallel arms 25 which extend from the medium 20 toward the open end of the body or the door 2 and are pivoted between their ends, as shown at 26, to a standard 27 which is erected upon the floor of the trap. This standard may also be of sheet metal and has a portion struck therefrom and turned laterally, as shown at 28, to constitute a guide for an arm 29 rising from the lever 30 which carries the treadle 31. The treadle 31 and its lever 30 are normally held in the position shown in Figure 4 by a trigger 32 which is secured to and depends from the arms 25 and carries a cross pin 33 at its lower end which is normally engaged by a hook-like extension 34 of the lever 30. The trigger in the set position engages a stop pin 34' which passes through a notch 35 in the edge of the trigger so that swaying of the trigger until it is released by the lever 30 will be prevented. The notch 35 is of such form that when the treadle and its lever are rocked, the trigger may readily disengage from the restraining pin 33.

When the trap is to be set, bait is placed upon the pan 31' adjacent the treadle and the bait lever is engaged with the pin 33 on the trigger, as shown in Figure 4, and as will be understood, it being noted that during the operation of setting the trap the door 2 is in the raised or open position so that access may be had to the interior of the trap through the open end thereof. When the trigger is engaged with the lever 30, the trigger arms 25 will be brought into the horizontal position, shown in Figure 4, and the inner end of the trip lever 16 will be raised, the killing medium 20 being also raised inasmuch as it is rigidly secured to the trigger arms and must follow the movement thereof. When the medium 20 is raised and the trigger is set the springs 21 will be put under tension so that if the trigger be released, the medium 20 will be at once freed. When the trap is set the door 11 will be held in its raised position by the lip or lug 15 resting upon the shorter end of the trip lever 16, as shown. When the trigger is released the member 20 at once drops under the influence of the springs 21 and consequently the inner end of the trip lever 16 will be unsupported and will be swung downwardly through its engagement with the upper end of the slot 23. This movement will slightly raise the door 11 until the short end of the lever has cleared the lug or lip 15, whereupon the door will drop by gravity thereby preventing the entrance of a second animal. The animal which first entered and stepped on the treadle to reach the bait so as to spring the trap will be directly under the killing medium 20 so that the descent of the latter by the influence of the springs will be with such force as to kill the animal quickly and humanely.

Should it be necessary at any time to clean or repair the trap and any of the parts cooperating therewith the large door or pivoted roof 6 may be readily swung upwardly and over onto the door 2, thereby exposing the greater portion of the interior of the trap.

The trap is very simple in construction and operates efficiently at all times.

What is claimed is:

1. A trap comprising a body, a treadle lever pivotally mounted within the body, trigger arms pivotally mounted in the body above the lever, a trigger carried by and depending from the inner ends of the trigger arms and adapted at its lower ends to engage the lever, a killing medium carried by the opposite ends of the trigger arms, and yieldable means for driving the killing medium upon release of the trigger.

2. A trap comprising a body, a killing medium mounted for vertical movement, a door slidably mounted upon an end of the body, a trip lever pivoted adjacent the end of the body and adapted at one end to engage and support the sliding door, the inner end of the trip lever being engaged with the killing medium, trigger arms secured to the killing medium and pivotally mounted between their ends within the body, a trigger secured to and depending from the inner ends of the trigger arms, and a treadle lever pivotally mounted below the trigger arms and having one end normally engaged with the lower end of the trigger.

3. A trap comprising a body, a treadle lever pivotally mounted within the body adjacent the bottom of the same, trigger arms pivotally mounted between their ends above the treadle lever, a trigger secured to and depending from the inner ends of the trigger arms and adapted at its lower end to be engaged by the treadle lever, a killing medium secured to the opposite ends of the trigger arms, and having projections at its upper end, retractile springs attached to said projections and to the bottom of the trap, and housings on the sides of the trap for said springs.

ROBERT C. BURNLEY.